US009266654B1

(12) United States Patent
Scott et al.

(10) Patent No.: US 9,266,654 B1
(45) Date of Patent: Feb. 23, 2016

(54) ZIP TIE FASTENER WITH A NON-RELEASABLE HEAD AND A RELEASABLE HEAD

(71) Applicants: William M. Scott, Bonita Springs, FL (US); Gihoon Song, Bonita Springs, FL (US)

(72) Inventors: William M. Scott, Bonita Springs, FL (US); Gihoon Song, Bonita Springs, FL (US)

(73) Assignee: William M. Scott, Bonita Springs, FL (US)

( * ) Notice: Subject to any disclaimer, the term of this patent is extended or adjusted under 35 U.S.C. 154(b) by 0 days.

(21) Appl. No.: 14/721,057

(22) Filed: May 26, 2015

(51) Int. Cl.
*B65D 63/14* (2006.01)
*B65D 63/10* (2006.01)
*F16L 3/233* (2006.01)

(52) U.S. Cl.
CPC ...... *B65D 63/1063* (2013.01); *B65D 2563/107* (2013.01); *B65D 2563/108* (2013.01); *F16L 3/2336* (2013.01); *Y10T 24/1498* (2015.01)

(58) Field of Classification Search
CPC ... Y10T 24/1498; Y10T 24/14; Y10T 24/141; Y10T 24/1306; Y10T 70/404; F16L 3/2336; F16L 3/133; F16L 3/14; F16L 3/233; E05B 75/00; H02G 3/30; A44C 5/0046; B65B 27/083; B65D 2563/105; B65D 63/1018; B65D 63/1054; B65D 63/1063; H01R 13/6392; H01R 13/6395
USPC ...................................................... 24/16 PB
See application file for complete search history.

(56) References Cited

U.S. PATENT DOCUMENTS

| | | | | |
|---|---|---|---|---|
| 3,302,258 A * | 2/1967 | Meyer | | 24/5 |
| 3,739,429 A * | 6/1973 | Kohke | | 24/16 PB |
| 4,752,054 A * | 6/1988 | Jonsson | | 248/51 |
| 4,898,542 A * | 2/1990 | Jones, Jr. | | 439/371 |
| 5,042,113 A * | 8/1991 | Severson et al. | | 24/16 PB |
| 5,079,804 A * | 1/1992 | Gregurich et al. | | 24/17 AP |
| 5,088,158 A * | 2/1992 | Burkholder | | 24/16 PB |
| 5,395,343 A * | 3/1995 | Iscovich | | 604/179 |
| 5,402,971 A * | 4/1995 | Bower | | 248/74.3 |
| 5,782,648 A * | 7/1998 | Peterson | | 439/369 |
| 6,151,761 A * | 11/2000 | Thompson | | 24/16 PB |
| 6,828,509 B2 * | 12/2004 | Ito et al. | | 174/135 |
| 7,062,820 B1 * | 6/2006 | Oestreich et al. | | 24/16 PB |
| 7,429,020 B2 * | 9/2008 | Huebner et al. | | 248/58 |
| 8,328,146 B2 * | 12/2012 | Yeh et al. | | 248/74.3 |
| D714,632 S * | 10/2014 | Pando | | D8/396 |
| 2002/0148077 A1 * | 10/2002 | Thompson | | 24/16 PB |
| 2006/0288540 A1 * | 12/2006 | Byars | | 24/30.5 R |
| 2007/0151081 A1 * | 7/2007 | Bauer | | 24/16 PB |
| 2011/0131768 A1 * | 6/2011 | Watson | | 24/16 PB |
| 2013/0312227 A1 * | 11/2013 | Wheelwright | | 24/16 PB |

* cited by examiner

*Primary Examiner* — Robert J Sandy
*Assistant Examiner* — David Upchurch
(74) *Attorney, Agent, or Firm* — Patents on Demand, P.A.; Brian K. Buchheit; Scott M. Garrett

(57) ABSTRACT

An elongated strap can include of a series of ratchet teeth along a portion of the length of the strap. The strap can include a first and second end. A releasable head of the first end can include a fastening mechanism (FM) and a release mechanism (RM). The head can include an opening having the FM for temporarily engaging a portion of the series of ratchet teeth when the second end of the elongated strap is inserted into the head forming a loop. The RM can be configured to non-destructively release the second end. A non-releasable head of the first end can include a cavity which can have a pawl for securely engaging a portion of the series of ratchet teeth when the second end of the elongated strap is inserted into the releasable head forming a loop. The pawl can disallow non-destructive disengaging of the end from the head.

20 Claims, 8 Drawing Sheets

System 110

Embodiment 130

Embodiment 150

*Front View 151*

Embodiment 160

*Side View 161*

Embodiment 170

*Side View 171*

200

Embodiment 210

*Front View 211*

Embodiment 230

*Side View 231*

*Side View 241*

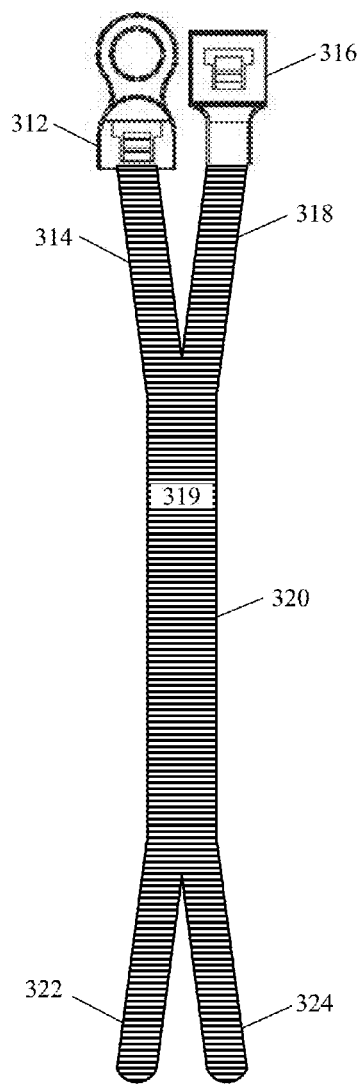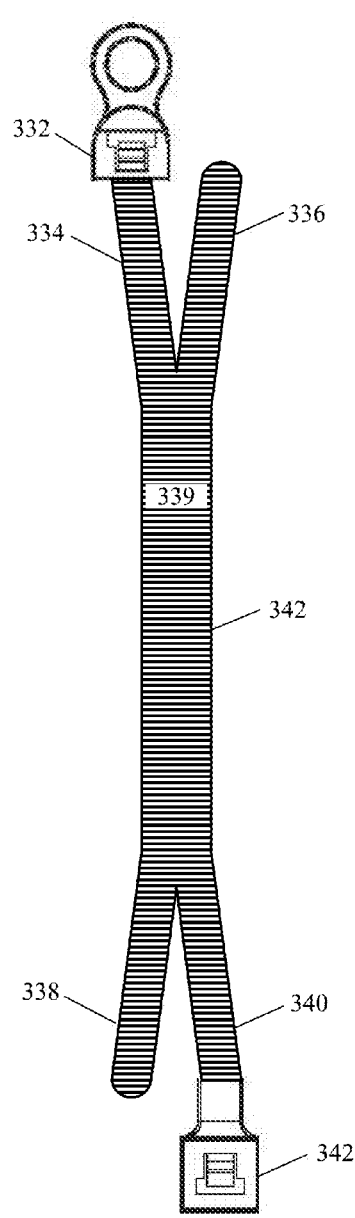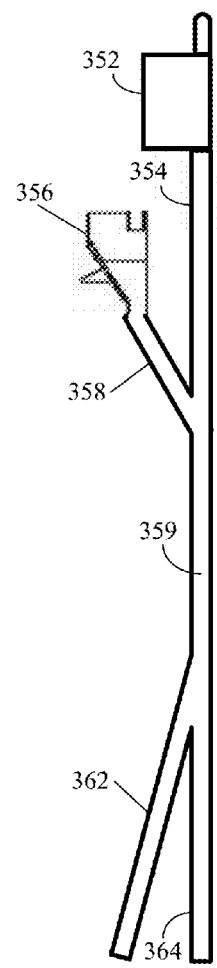
FIG. 3A
FIG. 3B
FIG. 3C

Embodiment 410
Front View 411
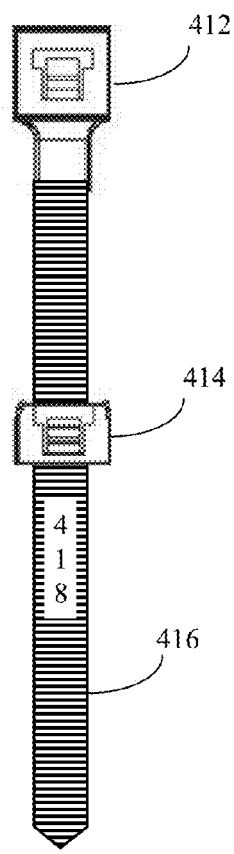
Embodiment 430
Front View 431
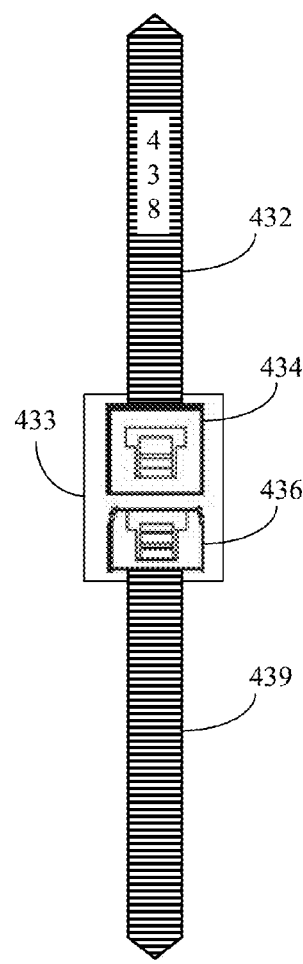
FIG. 4A
FIG. 4B

Embodiment 510

Embodiment 530

Embodiment 710

*Side View 721*

*Front View 741*

*Rear View 761*

*Isometric View 751*

*Isometric View 771*

ZIP TIE FASTENER WITH A NON-RELEASABLE HEAD AND A RELEASABLE HEAD

BACKGROUND

The present invention relates to the field of zip tie fasteners and, more particularly, to a zip tie fastener with a non-releasable head and a releasable head.

Zip ties are common household items typically sold in hardware stores that are used for not only tying bundles of cables, but for many other purposes. A typical tie is a plastic molded elongated strip with a fastening head which allows the tie to be secured against a variety of objects (e.g., poles, through eyelets). That way, the cable tie can be tightened around a bundle or other thing but not loosened. In many instances, when adjustments are necessary, the zip tie must be destructively removed and a new zip tie must be fastened. This traditional approach is inefficient and can be prohibitive when a limited quantity of zip ties are available.

To address some of these limitations, zip ties which can be released once fastened and then reused are traditionally utilized to overcome these limitations. However, reusable zip ties suffer from similar usage pattern restrictions as traditional zip ties. That is, reusable zip ties are unsuitable for permanent fastening situations. For example, reusable zip ties are not effective against minor tampering (e.g., removing tie without a tool). Consequently a new solution is required to address this necessity.

BRIEF SUMMARY

One aspect of the present invention can include a system for a hybrid zip tie. An elongated strap can include of a series of ratchet teeth along a portion of the length of the strap. The strap can include a first and second end. A releasable head of the first end can include a fastening mechanism (FM) and a release mechanism (RM). The head can include an opening having the FM for temporarily engaging a portion of the series of ratchet teeth when the second end of the elongated strap is inserted into the head forming a loop. The RM can be configured to non-destructively release the second end. A non-releasable head of the first end can include a cavity which can have a pawl for securely engaging a portion of the series of ratchet teeth when the second end of the elongated strap is inserted into the releasable head forming a loop. The pawl can disallow non-destructive disengaging of the end from the head.

Another aspect of the present invention can include a system for a hybrid zip tie. An elongated strap can include a series of ratchet teeth along a portion of the length of the strap. The strap can include a common portion and a first and second end. A releasable head of a first segment extending from the common portion can include a fastening mechanism and a release mechanism. The head can include an opening having the fastening mechanism for temporarily engaging a portion of the series of ratchet teeth of the elongated strap when the first or the second end of the elongated strap is inserted into the releasable head forming a loop. The release mechanism can be configured to non-destructively release the first or the second end when engaged in the fastening mechanism. A non-releasable head of the first end can include a pawl positioned within a cavity. The pawl can securely engage a portion of the series of ratchet teeth of the elongated strap when the first or the second end of the elongated strap is inserted into the releasable head forming a loop. The pawl can disallow non-destructive disengaging of the end from the head.

Yet another aspect of the present invention can include a system for a hybrid zip tie. A zip tie body can include a series of ratchet teeth along a front portion of the length of the strap and a rear portion of the rear of the strap. The strap can include a first and second end. A releasable head of the first end can include a fastener and a thumb release. The head can include an opening having the fastener for engaging the front portion of the series of ratchet teeth of the elongated strap when the second end of the elongated strap is inserted into the releasable head forming a loop. The thumb release can be configured to non-destructively release the second end when engaged in the fastener. A non-releasable head of the first end can include a cavity. The cavity can include a pawl for securely engaging the rear portion of the series of ratchet teeth of the elongated strap when the second end of the elongated strap is inserted into the releasable head forming a loop. The pawl can disallow non-destructive disengaging of the end from the head.

BRIEF DESCRIPTION OF THE SEVERAL VIEWS OF THE DRAWINGS

FIG. 3A, 3B, 3C are schematic diagrams illustrating a set of embodiments for a zip tie fastener with a non-releasable head and a releasable head in accordance with inventive arrangements disclosed herein.

FIG. 4A, 4B are schematic diagrams illustrating a set of embodiments for a zip tie fastener with a non-releasable head and a releasable head in accordance with inventive arrangements disclosed herein.

DETAILED DESCRIPTION

Figure 1A:
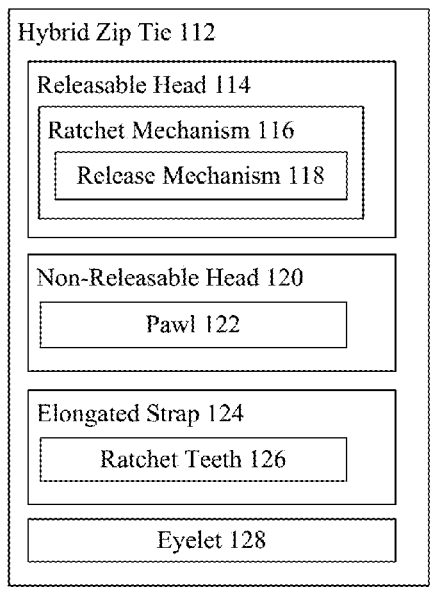
FIG. 1A, 1B, 1C, 1D are schematic diagrams illustrating a system and embodiments for a zip tie fastener with a non-releasable head and a releasable head in accordance with inventive arrangements disclosed herein.
Figure 1B:
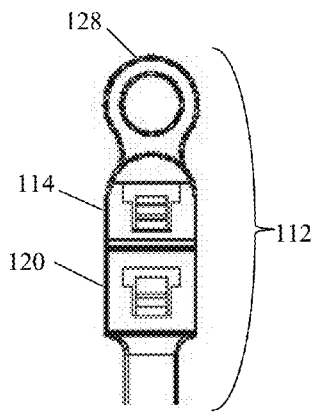
Figure 1C:
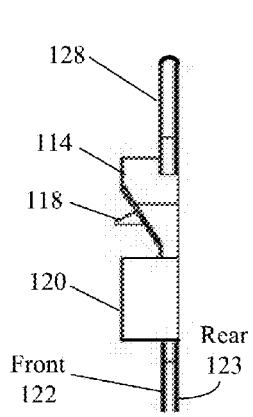
Figure 1D:
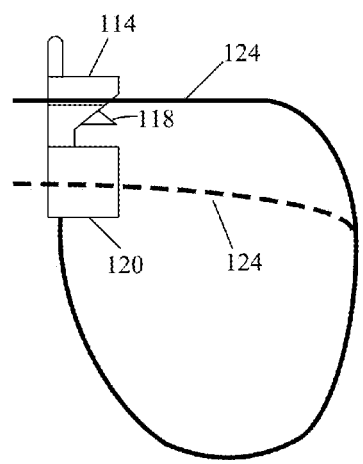

The present disclosure is a solution for a zip tie fastener with a non-releasable head and a releasable head. In the solution, a zip tie fastener can include a first end and a second end of an elongated strip with a integrated gear rack. In one embodiment, the non-releasable head and the releasable head can be located at the first end. In the embodiment, the elongated strip can be terminated with the non-releasable head and the releasable head can be adjacent to the non-releasable head (e.g., located next to the non-releasable head along the length of the elongated strip). In another embodiment, the elongated strip can be terminated at a first end with the non-releasable head. In the embodiment, a releasable head can be positioned midway along the length of the elongated strip. In yet another embodiment, the elongated strip can be terminated at one end with the releasable head and a second elongated strip protruding out from the elongated strip can be terminated with the non-releasable head. In the embodiment, the non-releasable head can be vertically "stacked" on the releasable head permitting the fastening of either the non-releasable head and/or the releasable head by the elongated strip.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A, 1B, 1C, 1D are schematic diagrams illustrating a system and embodiments (110A, 130 including views 131, 133, 135) for a zip tie fastener with a non-releasable head and a releasable head in accordance with inventive arrangements disclosed herein. System 110 can be present in the context of embodiment 130, 150, 160, 170, 210, 230, 310, 330, 350, 410, 430, 510, 530, 510, 610, 630, and/or 710. In system 110, a zip tie 112 can be enhanced with the combination of a releasable head 114 and a non-releasable head 120. The system 110 can include additional components, optional components, and the like. System 110 can include, but is not limited to, a cable ties (e.g., TY-RAP, PAN-TY), identification cable ties, heavy duty ties, low profile ties, and the like.

As used herein, a zip tie 112 can be a type of fastener for securely holding items together. Tie 112 can include a head which strap 124 can be inserted into forming a loop which can be fastened as the strap 124 is pulled through the head. Tie 112 can include an elongated strap 124 which can conform to any traditional and/or proprietary shape. In one instance, strap 124 can have a rectangular cross-section, a circular cross-section, and the like. For example, tie 112 can include a flat body with a tapered tail at the other end, and a body of generally constant rectangular cross section in between. Heads 114, 120 can include one or more distinguishing features including, but not limited, to distinguishing shape, distinguishing, size, distinguishing color, and the like. For example, releasable head 114 can be green in appearance to indicate the head is a releasable head differentiating the head 114 from head 120 (e.g., red in appearance).

Tie 112 material can include, but is not limited to, nylon, metal (e.g., stainless steel), plastic (Polypropylene, Fluoropolymer), and the like. It should be appreciated that the tie 112 can be made of any biodegradable material and non-biodegradable materials. Tie 112 shape, size, and/or appearance can include, but is not limited to, beaded cable ties, ladder style cable ties, identification cable ties, parallel entry cable ties, tear-off cable ties, and the like.

In system 110, a hybrid zip tie 112 can be an elongated strap 124 which can include a releasable head 114 and a non-releasable 120. Releasable head 114 can include a cavity with a ratchet mechanism 116 which can securely temporarily engage the strap 124 when strap 124 is placed into fastener 116. Ratchet mechanism 116 can include a catch, a pawl, a set of opposing ratchet teeth, and the like. In one instance, ratchet mechanism 116 can include a release mechanism 118 can disengage the ratchet mechanism (e.g., pawl) from the ratchet teeth 126 of elongated strap. Mechanism 116 can include a push mechanism, a pull mechanism, a rotational mechanism, and the like. That is, releasable mechanism can conform to any traditional and/or proprietary disengaging functionality of reusable cable ties. In one instance, head 114, 120 orientation and/or position can permit strap 124 to be secured within head 114 or head 120. In another instance, head 114, 120 orientation and/or position can permit strap 124 to be simultaneously secured within head 114 and head 120.

Non-releasable head 120 can include a hole with a pawl 122 which can engage the ratchet teeth 126 of the strap 124 to prevent reverse movement of the strap 124 through the hole in the head 120 to form a loop with the strap 124.

It should be appreciated that head 114, 120 orientation can be arbitrary. In one instance, head 114, 120 can be fastened from a single direction where the teeth 126 make contact with the ratchet mechanism 116 and/or pawl 122.

Drawings presented herein are for illustrative purposes only and should not be construed to limit the invention in any regard. In one instance, tie 112 can include an eyelet for mounting to a surface of a structure. Eyelet 128 shape can be circular, oval, square, and the like. For example, eyelet 128 can be a circular hole which can permit a screw to be placed through the eyelet 128 to fasten the zip tie 112 to a wooden post. It should be appreciated that ratchet teeth 126 can be present on either side (e.g., front or rear) of the strap 124 or can be present on both sides (e.g., front and rear).

In embodiment 130, a front view 131 and two side views 133, 135 of tie 112 can be presented. Top view 131 can illustrate one arrangement for heads 114, 120 along the strap 124. For example, the tie 112 can terminate at one end with an eyelet and head 120, 114 can be immediately adjacent with the head 114 proximate to the eyelet and the head 120 distal from the eyelet. Side view 133 can illustrate the protrusion of head 114, 120 from the elongated strap. For example, head 114, 120 can extend horizontally from the front 122 portion of strap 124 resulting in rear 123 surface remaining uniform along the length of the strap 124. Side view 135 can illustrate a fastened state of zip tie 112 using head 114 and/or head 120. In view 135, strap 124 can be looped and fed through head 116 or head 120 to create a fastened arrangement.

Drawings presented herein are for illustrative purposes only and should not be construed to limit the invention in any regard. It should be appreciated that proportions of head 114, 120 and/or strap 124 can be purposely exaggerated for the sake of clarity and should not be construed to limit the invention in any regard.

In one embodiment, strap 124 can be terminated with a detachable loop on the opposite side from the heads 114, 120. The detachable loop can be removed from the strap and can be attached on to the strap to join one two or more ties together.

Figure 1E:
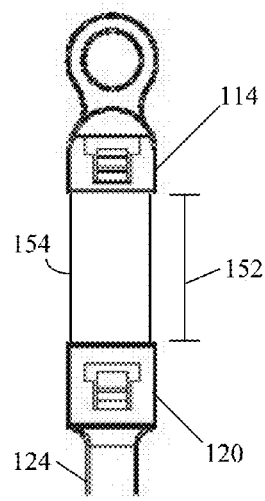
FIG. 1E, 1F, 1G are schematic diagrams illustrating a set of embodiments for a zip tie fastener with a non-releasable head and a releasable head in accordance with inventive arrangements disclosed herein.
Figure 1F:
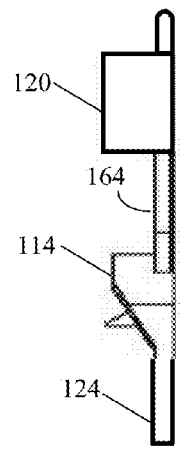
Figure 1G:
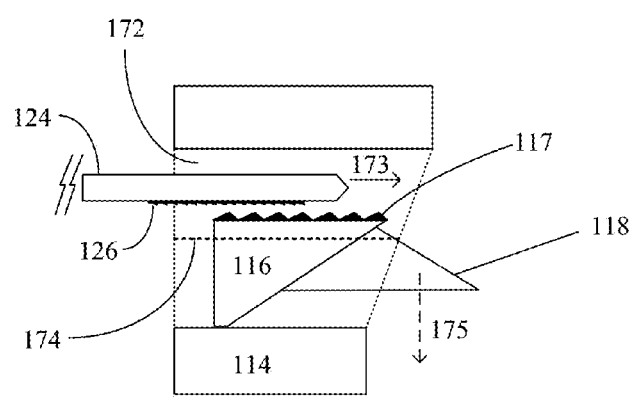

FIG. 1E, 1F, 1G are schematic diagrams illustrating a set of embodiments 150, 160, 170 for a zip tie fastener with a non-releasable head and a releasable head in accordance with inventive arrangements disclosed herein. Embodiments 150, 170 can be present in the context of system 110.

In embodiment 150, a front view 151 can illustrate a hybrid zip tie with a releasable head 114 and a non-releasable head 120. In the front view 151, head 114 can be proximate but separated from head 120 via a segment 154. Segment 154 length 152, width, and/or height can correspond to an arbitrary measure. For example, head 114 can be separated from head 120 via a ten centimeter long segment 154. It should be appreciated that segment 154 can be a portion of elongated strap 124.

In embodiment 160, a side view 161 can illustrate a hybrid zip tie with a releasable head 114 and a non-releasable head 120. In the side view 161, tie 112 can terminated with releasable head 120. Head 120 can be separated from releasable head 114 via segment 164. Segment 164 length, width, and/or height can correspond to an arbitrary measure. For example, head 120 can be separated from head 114 via a half inch long segment 164. It should be appreciated that segment 164 can be a portion of elongated strap 124.

In embodiment 170, a side view 170 can illustrate one arrangement for a ratchet mechanism 116 associated with releasable head 114. In the embodiment, elongated strap 124 can enter cavity 172 and contact ratchet mechanism 116. For example, ratchet mechanism can be a catch or pawl which can have ridges 117 configured to engage ratchet teeth allowing movement in only one direction 173. In one instance, ratchet mechanism 116 can be disengaged by pressing on release mechanism 118. For example a downward motion 175 can reposition mechanism 116 creating sufficient space between teeth 126 and ridges to allow strap 124 to be retracted unhindered through cavity (e.g., opposite of direction 173).

Drawings presented herein are for illustrative purposes only and should not be construed to limit the invention in any regard. It should be appreciated that head 114, 120 can be oriented inverse to each other along the length of the strap 124.

Figure 2A:
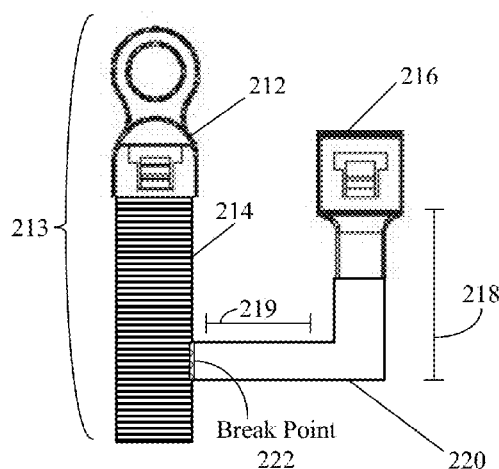
FIG. 2A, 2B, 2C are schematic diagrams illustrating a set of embodiments for a zip tie fastener with a non-releasable head and a releasable head in accordance with inventive arrangements disclosed herein.
Figure 2B:
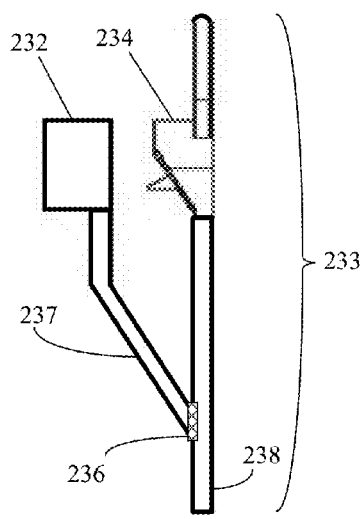
Figure 2C:
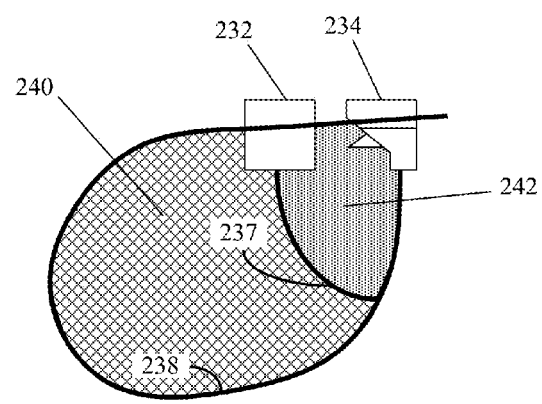

FIG. 2A, 2B, 2C are schematic diagrams illustrating a set of embodiments 210, 230 for a zip tie fastener with a non-releasable head and a releasable head in accordance with inventive arrangements disclosed herein. Embodiment 210, 230 can be present in the context of system 110, embodiment 130, 150, 160, 170, 310, 330, 350, 410, 430, 510, 530, 510, 610, 630, and/or 710.

In embodiment 210, a front view 211 can illustrate a hybrid zip tie 213 with a non-releasable head 212 and a detachable releasable head 216. In the view 211, a zip tie 213 can include a releasable head 216 at an end of elongated strap 214. Tie 213 can include a segment 220 which can include a releasable head 216 at the end of the segment 220. Segment 220 can extend from strap 214 in any traditional and/or proprietary manner. In one instance, segment 220 can branch from strap 214 along a horizontal portion of segment of a length 219 and a vertical portion of segment of a length 218. It should be appreciated that length 219, 218 can be arbitrary measures and is not limited to the view 211. In one embodiment, segment 220 can be destructively detached from strap 214 via a break point 222. In the embodiment, break point 222 can be a perforated region, breakaway region, and the like. For example, break point 222 can permit permanent detachment of releasable head 216 from strap 214 by toggling the segment 220 perpendicular to the surface of the break point 222.

In embodiment 230, a side view 231, 241 can illustrate a hybrid zip tie 233 with a non-releasable head 234 and a detachable releasable head 232. In the view 231, a zip tie 233 can include a releasable head 234 at an end of elongated strap 238. Tie 233 can include a segment 237 which can include a non-releasable head 232 at the end of the segment 237. Segment 237 can extend from strap 238 in any traditional and/or proprietary manner. In one instance, segment 237 can extend upwards from strap 238 surface along a diagonal portion of segment positioning the non-releasable head in front of releasable head 234. It should be appreciated that length of segment 237 can be an arbitrary measure and is not limited to the view 231. In one embodiment, segment 237 can be destructively detached from strap 238 via a break point 236. In the embodiment, break point 236 can be a perforated region, breakaway region, and the like. For example, break point 236 can permit permanent detachment of non-releasable head 232 from strap 238 by toggling the segment 237 perpendicular to the surface of the break point 236.

In side view 241, strap 238 can be simultaneously fastened to non-releasable head 232 and releasable head 234 creating two looped regions 240 and 242. In one instance, the tie 233 configuration can permit temporary and permanent securing of two or more objects rapidly. That is, the exit point of non-releasable head 232 can approximately line up with entry point of releasable 234 enabling continuous insertion of strap 238 through both heads 232, 234.

FIG. 3A, 3B, 3C are schematic diagrams illustrating a set of embodiments 310, 330, 350 for a zip tie fastener with a non-releasable head and a releasable head in accordance with inventive arrangements disclosed herein. Embodiment 310, 330, 350 can be present in the context of system 110.

In embodiment 310, a front view 311 can illustrate a hybrid zip tie 319 with a non-releasable head 312 and a releasable head 316. In the embodiment, tie 319 can be bifurcated at both ends creating a Y-shaped portion at each end. In the embodiment, four segments 314, 318, 322, 324 can be extend from a common body 320 of an elongated strap. In one instance, head 312 can be located at a terminal end of segment 314 and head 316 can be proximally located at a terminal end of segment 318. In the instance, segment 322 can permit the use of head 312 and segment 324 can permit the use of head 316. That is, each head 312, 316 can be used independently via ends 322, 324.

In embodiment 330, a front view 331 can illustrate a hybrid zip tie 339 with a non-releasable head 332 and a releasable head 342. In the embodiment, tie 339 can be bifurcated at both ends creating a Y-shaped portion at each end. In the embodiment, four segments 334, 336, 338, 340 can be extend from a common body 342 of an elongated strap. In one instance, head 332 can be located at a terminal end of segment 334 and head 342 can be distally located at a terminal end of opposing segment 340. In the instance, segment 338 can permit the use of head 332 and segment 336 can permit the use of head 342. That is, each head 312, 316 can be used independently via different opposing ends 336, 338.

In embodiment 350, a side view 351 can illustrate a hybrid zip tie 359 with a non-releasable head 352 and a releasable head 356. Tie 359 can include a non-releasable head 352 located at an end of elongated strap 354. Tie 359 can include a segment 358 which can include a releasable head 356 at the end of the segment 358. Segment 358 can extend from strap 354 in any traditional and/or proprietary manner. In one instance, segment 358 can extend upwards from strap 354 surface along a diagonal portion of segment positioning the releasable head 356 below non-releasable head 352. It should be appreciated that length of segment 358 can be an arbitrary measure and is not limited to the view 351.

In one instance, tie 359 can be bifurcated at one end creating a Y-shaped portion at one end (e.g., segment 362, 364). In the instance, segments 362, 364 can extend from a common body of an elongated strap 354. In the instance, segment 362 can permit the use of head 352 and/or head 356. In the instance, segment 364 can permit the use of head 352 and/or 356. In one instance, segment 362 can be placed into head 356 and segment 364 can be placed into head 352 creating two distinct and separate loops (e.g., inner formed from 362, 356 and outer formed from 364, 352). That is, each head 352, 356 can be used independently or simultaneously.

FIG. 4A, 4B are schematic diagrams illustrating a set of embodiments 410, 430 for a zip tie fastener with a non-releasable head and a releasable head in accordance with inventive arrangements disclosed herein. Embodiment 410, 430 can be present in the context of system 110.

In embodiment 410, a front view 411 can illustrate a hybrid zip tie 418 with a non-releasable head 414 and a releasable head 412. In one configuration of the embodiment, elongated strap 416 can be terminated at one end by releasable head 412. In the configuration, a non-releasable head 414 can be placed approximately midway down the length of the elongated strap 416. That is, tie 418 can be utilized to form a small loop for permanent fastening and a large loop for temporary fastening. It should be appreciated that head 414, 412 position can be swapped resulting in tie 418 terminated at an end with head 414 and head 412 positioned in the middle of the strap 416.

In embodiment 431, a front view 431 can illustrate a hybrid zip tie 438 with a fastening block 433 which can include a releasable head 434 and a non-releasable head 436. In the embodiment, 431, a fastening block 433 can be positioned approximately midway along the length of an strap elongated of tie 438. In one instance, strap can be divided into two even segments 432, 439 which can be fastened to head 434, 436. In the instance, segment 432 can be fastened to head 434 or head 436 to permit segment 432 to form a loop which can be temporarily or permanently established. In the instance, segment 439 can be fastened to head 436 or head 434 to permit segment 439 to form a loop which can be permanently or temporarily established. It should be appreciated that head 434, 436 can be swapped. It should be appreciated that fastening block 434 can be arbitrarily placed along the length of tie 438 (e.g., dividing the strap of tie 438 into a one third segment and a two thirds segment).

Figure 5A:
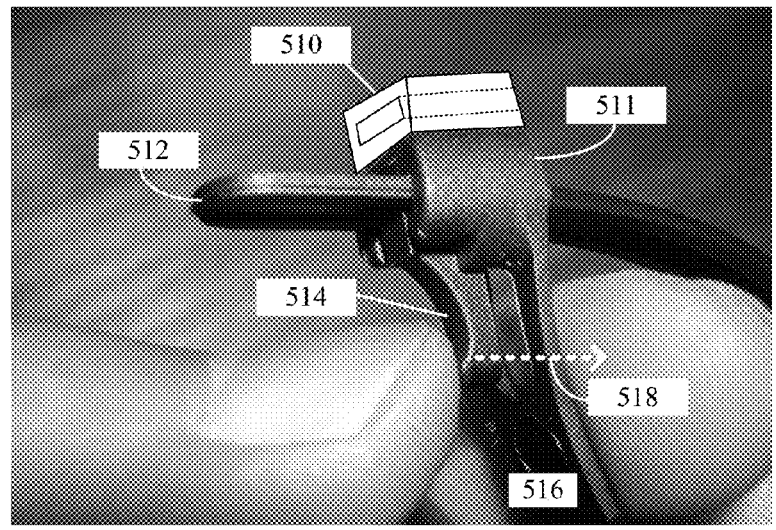
FIG. 5A, 5B are schematic diagrams illustrating a set of embodiments for a zip tie fastener with a non-releasable head and a releasable head in accordance with inventive arrangements disclosed herein.
Figure 5B:
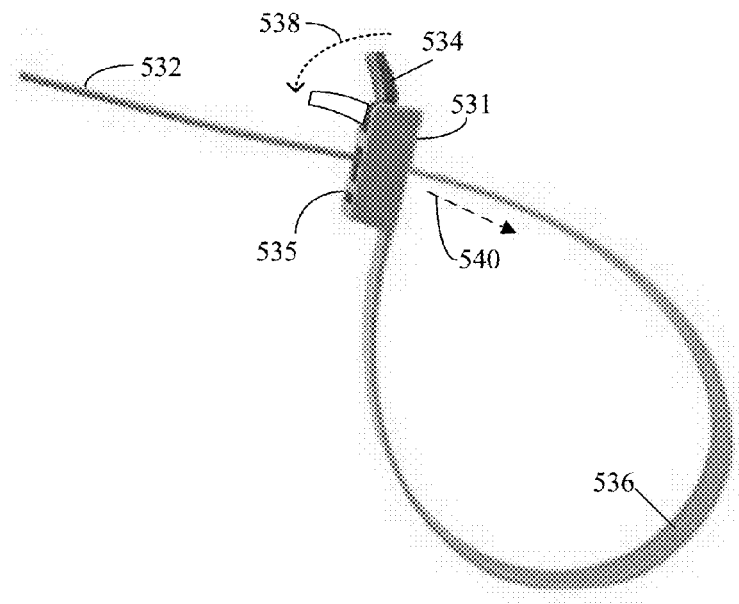

FIG. 5A, 5B are schematic diagrams illustrating a set of embodiments 510, 530 for a zip tie fastener with a non-releasable head and a releasable head in accordance with inventive arrangements disclosed herein. Embodiment 510, 530 can be present in the context of system 110.

In embodiment 510, a hybrid zip tie 516 with a non-releasable head 510 and a releasable head 511. In the embodiment, strap 512 engaged in head 511 can be released from the head 511 via a release lever 514. For example, when lever 514 is squeezed between a user's thumb and forefinger pushing the lever 514 in direction 518 the strap 512 can be pulled out of head 511 in direction 518.

In embodiment 530, a hybrid zip tie 536 with a non-releasable head 535 and a releasable head 531. In the embodiment, strap 532 engaged in head 531 can be released from the head 531 via a release lever 534. For example, when lever 534 is rotated downward 538 the strap 532 can be pulled out of head 531 in direction 540.

Figure 6A:
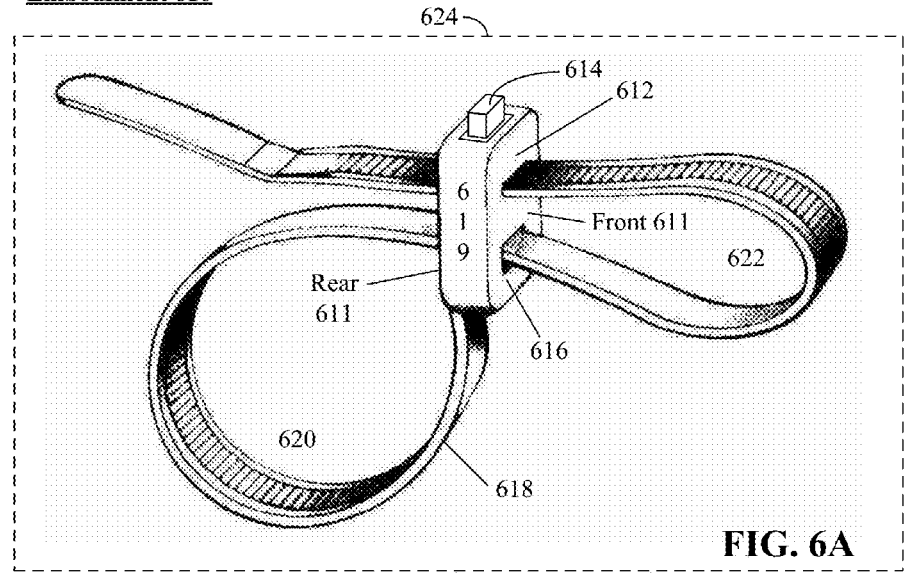
FIG. 6A, 6B are schematic diagrams illustrating a set of embodiments for a zip tie fastener with a non-releasable head and a releasable head in accordance with inventive arrangements disclosed herein.
Figure 6B:
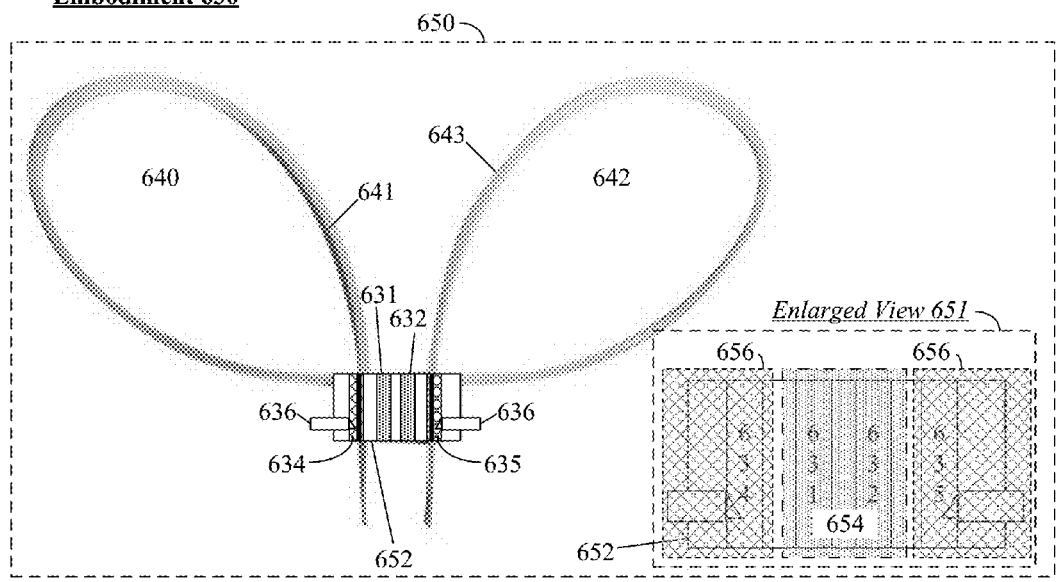
Figure 7A:
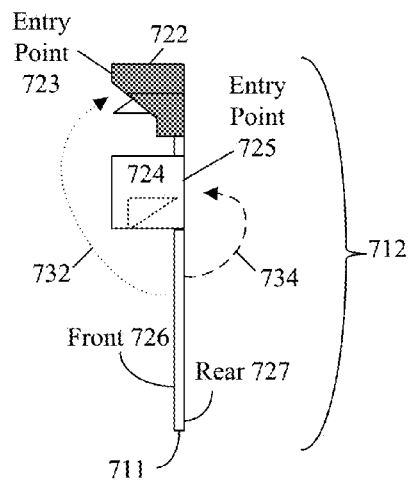
FIG. 7A, 7B, 7C, 7D 7E are schematic diagrams illustrating an embodiment for a zip tie fastener with a non-releasable head and a releasable head in accordance with inventive arrangements disclosed herein.
Figure 7B:
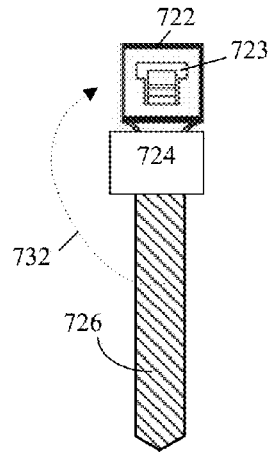
Figure 7C:
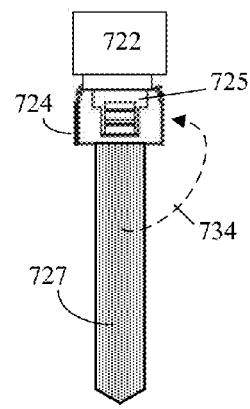
Figure 7D:
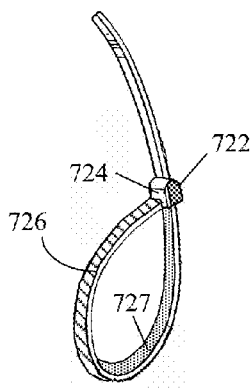
Figure 7E:
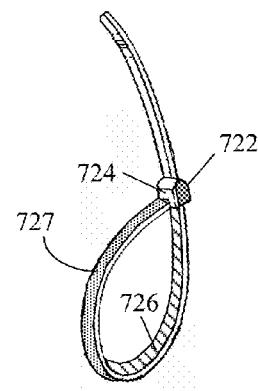

FIG. 6A, 6B are schematic diagrams illustrating a set of embodiments 610, 630 for a zip tie fastener with a non-releasable head and a releasable head in accordance with inventive arrangements disclosed herein. Embodiment 610, 630, can be present in the context of system 110.

In embodiment 610, a hybrid zip tie 624 with a non-releasable head 616 and a releasable head 612 within a fastening block 619. In the embodiment, head 616, 612 orientation can be opposite each other. That is, entry point of head 616 can be at the rear 611 of block 619 and entry point of head 612 can be at the front of block 619. In the embodiment, strap 618 can be fastened through head 612 forming loop 620 and simultaneously fastened through head 612 forming loop 622. That is, strap 618 can be released from head 612 via release button 614 without affecting loop 610. In embodiment 630, a double loop hybrid zip tie 650 with a non-releasable head 654 and a releasable head 656 within a fastening block 619. Enlarged vie 651 can present a magnified view of fastening block 652. In the embodiment, tie 650 can include two elongated straps 641, 643. Strap 641 can be looped (e.g., loop 640) and fastened to channel 631 of non-releasable head 654 or can be fastened to channel 634 of releasable head 656. Strap 643 can be looped (e.g., loop 642) and fastened to channel 632 of non-releasable head 654 or can be fastened to channel 635 of releasable head 656. Release mechanism 636 can disengage ratchet mechanism of head 656 allowing strap 641, 643 to be released.

Drawings presented herein are for illustrative purposes only and should not be construed to limit the invention in any regard. In one embodiment, tie 650 can be a PLASTICUFFS, tactical plastic handcuff, and the like. It should be appreciated orientation and/or position of release mechanism 636 can be situated to reduce likelihood of usage by a restrained person when the tie 650 is used as a handcuff restraint.

FIG. 7A, 7B, 7C, 7D 7E are schematic diagrams illustrating an embodiment 710 (shown with views 721, 741, 751, 761, 771) for a zip tie fastener with a non-releasable head and a releasable head in accordance with inventive arrangements disclosed herein.

In embodiment 710, a side view 721, front view 741, 761, and an isometric view 751, 771 can illustrate a reversable hybrid zip tie 711 with a non-releasable head 724 and a releasable head 722. In the side view 721, a releasable head 722 can include an entry point 723 parallel to front 726 of tie 711 and a non-releasable head 724 with an entry point 725 parallel to the rear 727 of tie 711. In the embodiment, elongated strap 712 can be fastened into head 722 by forming a loop 732 and strap 712 can be fastened into head 724 by forming a loop 734.

In one embodiment, zip tie 712 can be color coded to enhance usability and simplify use. In the embodiment, head 722, 724 can be distinguished by different colors and/or patterns For example, non-releasable head can be red indicating one time use and releasable head can be green indicating multiple reuse is possible.

In another embodiment, head 722, 724 can be colored and the corresponding side (e.g., front 726, rear 727) of strap 711 can be appropriately colored to match. For example, head 722 and front 726 of elongated strap 711 can be green and head 724 and rear 727 can be red. That is, each side of the elongated strap 711 can be differently colored such that when a loop is formed by inserting the strap into a head the exterior surface formed by the loop can present an appropriate color. For example, when the strap 711 is inserted into the releasable head 722 the green side (e.g., 726) of the strap can be visible and when the strap 711 is inserted into the non-releasable head the red side (e.g., 727) of the strap can be visible.

Drawings presented herein are for illustrative purposes only and should not be construed to limit the invention in any regard. It should be appreciated that either head 722, 724 and/or front 726, 727 can be color coded and the disclosure is not limited to the arrangement of embodiment 710.

The flowchart and block diagrams in the FIGS. 1-7 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for a hybrid zip tie comprising:
an elongated strap comprising of a series of ratchet teeth along at least a portion of the length of the strap, wherein the strap comprises of a first and second end;
a releasable head of the first end comprising of a fastening mechanism and a release mechanism, wherein the releasable head comprises of an opening having the fastening mechanism for temporarily engaging a portion of the series of ratchet teeth of the elongated strap when the second end of the elongated strap is inserted into the releasable head forming a loop, wherein the release mechanism is configured to non-destructively release the second end when engaged in the fastening mechanism of the releasable head; and
a non-releasable head of the first end comprising of a cavity, wherein the cavity comprises of a pawl for securely engaging a portion of the series of ratchet teeth of the elongated strap when the second end of the elongated strap is inserted into the non-releasable head forming a loop, wherein the pawl disallows non-destructive disengaging of the second end from the non-releasable head.

2. The system of claim 1, wherein the releasable head is located more towards a terminal portion the first end then the non-releasable head.

3. The system of claim 1, wherein the hybrid zip tie comprises of an eyelet.

4. The system of claim 1, wherein the releasable head is linearly attached to the elongated strap at the first end.

5. The system of claim 1, wherein the non-releasable head is linearly attached to the elongated strap at the first end.

6. The system of claim 1, wherein the elongated strap is terminated with a detachable loop on the opposite side from the releasable and non-releasable heads, wherein the detachable loop is able to be removed from the elongated strap.

7. The system of claim 1, wherein the first end of the elongated strap is bifurcated to produce two different first ends, one of the two different first ends being the first end of the releasable head, another of the two different first ends being the first end of the non-releasable head.

8. The system of claim 1, wherein the elongated strap includes a break point permitting the releasable head to be removed from the hybrid zip tie while the non-releasable head is retained in a functional configuration.

9. The system of claim 1, wherein the second end of the elongated strap is able to be inserted simultaneously into both the non-releasable head and the releasable head.

10. The system of claim 1, wherein the releasable head is detachable from the hybrid zip tie.

11. A system for a hybrid zip tie comprising:
   an elongated strap comprising of a series of ratchet teeth along at least a portion of the length of the strap, wherein the strap comprises of a common portion and a first and second end;
   a releasable head of a first segment extending from the common portion comprising of a fastening mechanism and a release mechanism, wherein the releasable head comprises of an opening having the fastening mechanism for temporarily engaging a portion of the series of ratchet teeth of the elongated strap when the first or the second end of the elongated strap is inserted into the releasable head forming a loop, wherein the release mechanism is configured to non-destructively release the first or the second end when engaged in the fastening mechanism; and
   a non-releasable head of the first end comprising of a pawl positioned within a cavity, wherein the pawl securely engages a portion of the series of ratchet teeth of the elongated strap when the second end of the elongated strap is inserted into the non-releasable head forming a loop, wherein the pawl disallows non-destructive disengaging of the second end from the non-releasable head.

12. The system of claim 11, wherein the first end is able to be engaged into the releasable head forming a first loop and the second end is able to be simultaneously engaged into the non-reusable head forming a second loop.

13. The system of claim 11, wherein the releasable head is linearly attached to the elongated strap at the first end.

14. The system of claim 11, wherein the non-releasable head and the releasable head are linearly attached to the elongated strap at the first end.

15. The system of claim 14, wherein the second end of the elongated strap is bifurcated into a first and second tail, wherein the first tail comprises of the releasable head.

16. The system of claim 14, wherein the second end of the elongated strap is bifurcated into a first and second tail, wherein the second tail comprises of the non-releasable head.

17. The system of claim 14, wherein the releasable head is located at the first end and is linearly arranged above the non-releasable head such that the releasable head is located more towards a terminal portion the first end then the non-releasable head.

18. The system of claim 1, wherein the first end of the elongated strap is able to be inserted simultaneously into both the releasable head and the non-releasable head.

19. A system for a hybrid zip tie comprising:
   a zip tie body comprising of at least one set of ratchet teeth along a a linear length of an elongated strap, wherein the elongated strap comprises of a first and second end;
   a releasable head of the first end comprising of a fastener and a thumb release, wherein the releasable head comprises of an opening for engaging the at least one set of ratchet teeth of the elongated strap when the second end of the elongated strap is inserted into the opening of the releasable head forming a loop, wherein the thumb release is configured to non-destructively release the second end when engaged in the fastener; and
   a non-releasable head of the first end comprising of a cavity, wherein the cavity comprises of a pawl for securely engaging the at least one set ratchet teeth of the elongated strap when the second end of the elongated strap is inserted into the non-releasable head forming a loop, wherein the pawl disallows non-destructive disengaging of the second end from the non-releasable head.

20. The system of claim 19, wherein the releasable head is located more towards a terminal portion the first end then the non-releasable head.

\* \* \* \* \*